United States Patent
Wolf et al.

(10) Patent No.: US 10,350,953 B2
(45) Date of Patent: Jul. 16, 2019

(54) VEHICLE WITH AXLE SUSPENSION

(71) Applicant: Deere & Company, Moline, IL (US)

(72) Inventors: Guenther Wolf, Worms (DE); Christian Von Holst, Hettenleidelheim (DE); Michael Kremb, Rockenhausen (DE); Tobias Hegler, Hassloch (DE); Norman Roessel, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/271,832

(22) Filed: Sep. 21, 2016

(65) Prior Publication Data

US 2017/0113503 A1    Apr. 27, 2017

(30) Foreign Application Priority Data

Oct. 22, 2015   (DE) .................. 10 2015 220 630

(51) Int. Cl.
  *B60G 9/02*   (2006.01)
  *B60B 35/00*   (2006.01)
  (Continued)

(52) U.S. Cl.
  CPC .............. *B60G 9/02* (2013.01); *B60B 35/004* (2013.01); *B60B 35/16* (2013.01); *B60G 9/027* (2013.01);
  (Continued)

(58) Field of Classification Search
  CPC .... B60G 9/02; B60G 2200/322; B62D 49/06; B60B 35/004; B60B 35/16
  See application file for complete search history.

(56) References Cited

U.S. PATENT DOCUMENTS 5,513,875 A * 5/1996 Tahara ..................... B60G 9/02
                                                    280/124.112
5,639,119 A * 6/1997 Plate ........................ B60G 9/02
                                                    280/124.112
(Continued)

FOREIGN PATENT DOCUMENTS

DE          3901757 A1    8/1989
DE         19643263 A1    4/1998
(Continued)

OTHER PUBLICATIONS

European Search Report in foreign counterpart application EP16194741.1 dated Feb. 23, 2017 (8 pages).

(Continued)

*Primary Examiner* — Drew J Brown

(57) ABSTRACT

A vehicle includes a support structure and a suspension for an oscillatingly supported, rigid axle body. The suspension has a suspension device which is located between the axle body and the support structure and acts in a height direction of the vehicle. The vehicle further includes a plurality of coupling sites and a transverse link extending in a transverse direction of the vehicle. The transverse link is coupled to the support structure via a first link area and via a second link area and a pendulum support to the axle body. The transverse link includes a third link area which, with reference to the pendulum support in the transverse direction of the vehicle, is located opposite the first link area and is flexibly connected with a coupling site of the suspension device.

17 Claims, 3 Drawing Sheets

(51) Int. Cl.
 *B60B 35/16* (2006.01)
 *B62D 49/06* (2006.01)
(52) U.S. Cl.
 CPC ........ *B62D 49/06* (2013.01); *B60G 2200/322* (2013.01); *B60G 2200/324* (2013.01); *B60G 2200/341* (2013.01); *B60G 2200/422* (2013.01); *B60G 2200/44* (2013.01); *B60G 2204/128* (2013.01); *B60G 2204/129* (2013.01); *B60G 2204/416* (2013.01); *B60G 2204/46* (2013.01); *B60G 2300/082* (2013.01)

(56) References Cited

U.S. PATENT DOCUMENTS

| | | | | |
|---|---|---|---|---|
| 5,813,697 | A * | 9/1998 | Bargenquast | B60G 9/02 280/6.154 |
| 5,879,016 | A * | 3/1999 | Altherr | B60G 9/027 280/124.112 |
| 6,607,204 | B2 | 8/2003 | Krone et al. | |
| 7,510,198 | B2 * | 3/2009 | Rach | B60G 9/022 280/124.112 |
| 7,644,942 | B2 * | 1/2010 | Bordini | B60G 9/022 280/124.112 |
| 8,534,412 | B2 * | 9/2013 | Huhn | B60G 9/022 180/312 |
| 2001/0052684 | A1 * | 12/2001 | Krone | A01D 67/00 280/124.112 |
| 2002/0093153 | A1 * | 7/2002 | Scotese | B60G 9/02 280/6.153 |

FOREIGN PATENT DOCUMENTS

| | | |
|---|---|---|
| DE | 20007795 U1 | 10/2010 |
| EP | 1108569 A2 | 6/2001 |
| EP | 1151656 A2 | 11/2001 |
| WO | 8905742 A1 | 6/1989 |

OTHER PUBLICATIONS

German Search Report in foreign counterpart application No. DE 102015220630.0, dated Oct. 12, 2016 (9 pages).

* cited by examiner

VEHICLE WITH AXLE SUSPENSION

RELATED APPLICATIONS

This application claims the benefit of German Application Ser. No. 102015220630.0, filed on Oct. 22, 2015, the disclosure of which is hereby expressly incorporated by reference in its entirety.

FIELD OF THE DISCLOSURE

The present disclosure relates to a vehicle with a suspension for a pendulum-mounted, rigid axle body, and in particular to an axle suspension having a suspension device which is located between the axle body and a support structure of the vehicle and acts in the height direction of the vehicle.

BACKGROUND

Agricultural vehicles and industrial commercial vehicles, such as, for example, farm tractors, frequently have a rigid front axle body that supports steerable wheels. So that the wheels do not lose their contact with the ground in the case of uneven ground, the front axle body of a front axle is pendulum-mounted on the support structure of the vehicle.

A conventional agricultural vehicle can be a farm tractor with a pendulum-mounted and spring suspension of the axle body of a vehicle front axle. This conventional axle suspension includes a transverse link that runs in the transverse direction of the vehicle and a vertically acting spring device with two hydraulic cylinders.

SUMMARY

In one embodiment of the present disclosure, a vehicle such as a tractor, a farm tractor, or the like has an axle suspension for a pendulum-mounted, rigid axle body. The axle body is, in particular, a component of a vehicle wheel axle (for example, a front or rear axle) on which vehicle wheels are mounted. To produce the axle suspension, a suspension device is placed between the axle body and a support structure (for example, an undercarriage, a chassis, or a frame) of the vehicle. It acts, with at least one effective component, in the height direction of the vehicle. This suspension device contains, for example, a damper element or a spring element for the damping of vertical forces acting on the vehicle. For their coupling with the support structure and the axle body, the suspension device has corresponding coupling sites. Aside from the suspension device, the axle suspension also has a so-called transverse link (or a transverse strut, in particular, a Panhard bar). This transverse link runs in the transverse direction of the vehicle. The transverse link is linked to the support structure with a first link area. The transverse link is linked to the axle body with a second link area via a pendulum support. In this way, the transverse link provides a lateral support for the axle body and allows the axle body to swing or oscillate with respect to the pendulum support. With a third link area, the transverse link is flexibly connected with a coupling site of the suspension device. The transverse link is thereby designed and placed in such a way that its third link area is located opposite the first link area, with respect to the pendulum support, in the transverse direction of the vehicle.

Thus, the transverse link acts as a two-armed lever with respect to the pendulum support or the second link area. In this way, an effect of the suspension device (for example, a spring or damping effect height) can be introduced both on the third link area as well as on the first link area of the transverse link. Even if the suspension device (with respect to the pendulum support, along the transverse direction of the vehicle) is merely present on one side, the effect of the suspension device can also be made available on the other side of the pendulum support, whereas, simultaneously, the oscillation of the axle is possible, via the flexible connection, between the axle body and the transverse link on the second link area. The transverse link with a third link area consequently reduces the number of the necessary components for a sufficient vertical suspension effect. For example, in this case with the spring device, a vertically acting hydraulic cylinder can be omitted on one of the two sides of the support structure (with respect to the pendulum support along the vehicle transverse direction). In addition to a low-cost structure, this axle suspension has the advantage that with few components, it is set up in a way that is very space-saving, wherein a greater space flexibility is produced for the installation of other parts and components in the area between the support structure and a vehicle axle. Moreover, the installation effort and costs are correspondingly reduced.

The flexible connection between the first link area of the transverse link and the support structure contains an axle link or a spherical link so as to attain a favorable mechanical coupling within the undercarriage. The axle of the axle link is, in particular, placed parallel to the longitudinal direction of the vehicle. The aforementioned axle link is supplemented in one embodiment with a support made of an elastic material, so as to set up a spherical joint connection between the transverse link and the support structure.

As previously described, the suspension device has several mechanical coupling sites, so as to have an effect between the axle body and the support structure. In one embodiment, the suspension device is flexibly connected with the support structure by means of a coupling site at a distance from the third link area of the transverse link, so as to attain an efficient axle suspension in a height or vertical direction.

The flexible connection of at least one coupling site, or in particular, all coupling sites, of the suspension device contains an axle link. In this way, the suspension device is flexibly connected, for example, with the support structure or with the transverse link. In particular, the used link axles are situated parallel to one another. The axle-flexible connections make possible an efficient coupling between the suspension device and the support structure and the transverse link in a low-cost and simple installation-technical manner.

In another embodiment, the aforementioned flexible connection of at least one coupling site—in particular, of all coupling sites—of the suspension device contains a spherical link, wherein forces attacking the vehicle with force components that deviate from the height or vertical direction are also simply intercepted technically by means of the suspension device.

The aforementioned effect of a spherical link connection can be attained, in one variant, in that a link axle, especially one running in the longitudinal direction of the vehicle, is surrounded by a support made of elastic material on the individual coupling site of the suspension device.

Depending on the specific demand made on the axle suspension, the construction or positioning of the transverse link, relative to the support structure and the axle body, can be designed differently.

In another embodiment, the transverse link is constructed in such a way that a conceived connecting line between the first link area and the second link area runs approximately parallel to a central longitudinal axis of the axle body when the axle body is in a non-oscillated central position. This construction can be produced at low cost, for example, in strut-like form which is long and space-saving.

For a space-saving placement of the transverse link with a simultaneously effective force transfer between the transverse link and the suspension device, it is advantageous if the transverse link is designed in such a way that the second link area and the third link area of the transverse link or corresponding link axles are staggered in the height direction of the vehicle when the axle body is in a non-oscillated central position. Between the second and the third link areas, the transverse link can then be implemented, for example, by one or more bent strut sections or several strut sections that are angled relative to one another.

The transverse link is constructed as one piece, which supports its mechanical stability during operation. In this case, each of the aforementioned strut sections is a one-piece component of the transverse link.

In another development, the transverse link is dimensioned in such a way that the third link area of the transverse link or a link axle of this third link area is located, along the height direction, at least at the level of a rotational axle of vehicle wheels supported on the axle body. The third link area of the transverse link or a link axle of this third link area is located above this rotational axle. The link axle is, in particular, the rotational axle of an axle link on the third link area or a conceived link axle of a spherical link on the third link area.

A pendulum axle of the pendulum support is located above a rotational axle of vehicle wheels supported on the axle body so as to attain a favorable oscillation and swinging behavior of the axle body or the rigid axle supporting the vehicle wheels.

In a further embodiment, a pendulum axle of the pendulum support is located in an axle central plane that is transverse to the axial extension of the axle body. In this way, a uniform effect of the axle suspension is supported on both sides of the vehicle—that is, in the transverse direction on both sides of the pendulum support.

The pendulum support has an axle link. Its link axle or pendulum axle runs, in particular, parallel to the longitudinal direction of the vehicle.

As was already mentioned, the suspension device can have a damper element or a spring element that acts in the height direction of the vehicle. Whereas the suspension device usually has spring characteristics that act in the height or vertical direction of the vehicle, the use of a damper can support traveling safety and comfort because of its oscillation-damping characteristics. In a successfully proven space-saving embodiment, a spring-damper combination, for example, can include an impact damper and a coil spring that surrounds it. Alternatively, a leaf spring with or without a combined damper element can be provided for the suspension device. In other embodiments, air or gas springs or hydropneumatic springs can be used. Depending on the technical design, the suspension device can either work passively or can be controlled from the outside to change its spring or damping characteristics. This control can be carried out by a user. Alternatively, the control is automatically carried out, in particular, as a function of specific parameters, such as the state of the ground or the loading conditions. Such a control enables the availability of a so-called active suspension.

Based on its physical construction, the suspension device can be set up in such a way that it has a variable suspension or a variable damping. In this way, the suspension device can be adapted even without an external control of the different states of the vehicle, such as different loading conditions.

In another embodiment, the suspension device can be operated in different modes of operation in such a way that the distance between the coupling site that is flexibly connected with the transverse link and the coupling site that is flexibly connected with the support structure in one mode of operation can be adjusted in an unchangeable manner, and is changeable in one or more other modes of operation. In this way, the suspension device can, as needed, also be used as a rigid connection between the transverse link and the support structure. The axle body or the corresponding vehicle axle can then be operated as unsprung, oscillating axles.

The axle body is a component of a driven front axle of the vehicle. Usually, the front axle is designed to be steerable.

Advantageously, a vehicle thrust link is provided that runs in the longitudinal direction of the vehicle, connected on one hand with the axle body, and on the other hand with the support structure. This allows the axle body to be supported on the support structure of the vehicle in the longitudinal direction. For example, braking and acceleration forces can be effectively absorbed.

The thrust link may have an elongated strut-type or tubular shape. It is designed such that it accommodates or at least partially surrounds a link shaft arranged between two vehicle axles. The already-existing link shaft can hereby be arranged in a space-saving way, and is protected from any undesired external influences or damage.

The connection of the thrust link with the axle body is rigidly designed. A connection is provided between the thrust link and the support structure; in particular, the connection is designed flexible, for example, like a spherical link. The aforementioned connection between the thrust link and the support structure also includes a variant in which the thrust link is indirectly connected with the support structure in that the thrust link is connected with a component (for example, a gearbox housing) that is rigidly fixed on the support structure.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
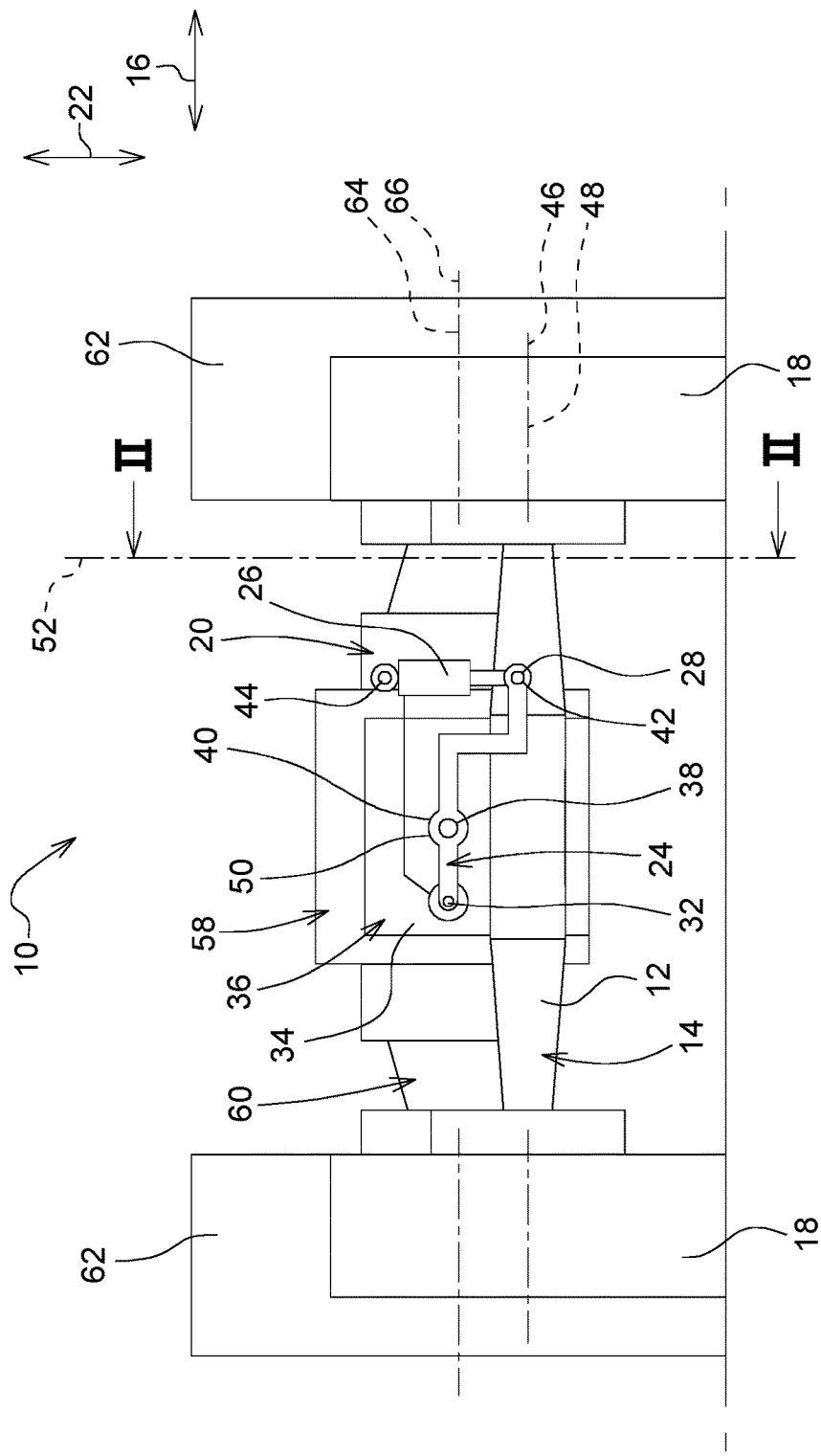
FIG. 1 is a schematic front view of an agricultural vehicle with a front axle suspension.

FIG. 1 schematically shows the essential parts of a suspended pendulum-mounted axle suspension of an agricultural vehicle 10 in the form of a tractor. The axle suspension refers to a rigid axle body 12 of a front axle 14 of the vehicle 10 designed as a rigid axle. In the usual manner, two front wheels 18, opposite one another in the transverse direction 16, are supported on the axle body 12. In one embodiment, a steering of the front wheels 18 is provided in the usual manner, in that they are swiveled relative to the axle body 12, for example, by means of a steering cylinder and a steering rod.

The axle suspension has a suspension device 20, with spring and damping characteristics in the height direction 22 of the vehicle 10, and a transverse link 24. The suspension device 20 contains a hydraulic cylinder 26 as an impact damper, whose effective ends form a coupling site. For its spring-damping function, the hydraulic cylinder 26 is connected in the usual manner with components that are not depicted here, such as a hydraulic line, a control valve, and a pressure accumulator. Via a first coupling site 28, the suspension device 20 or the hydraulic cylinder 26 is flexibly connected with the transverse link 24.

Figure 2:
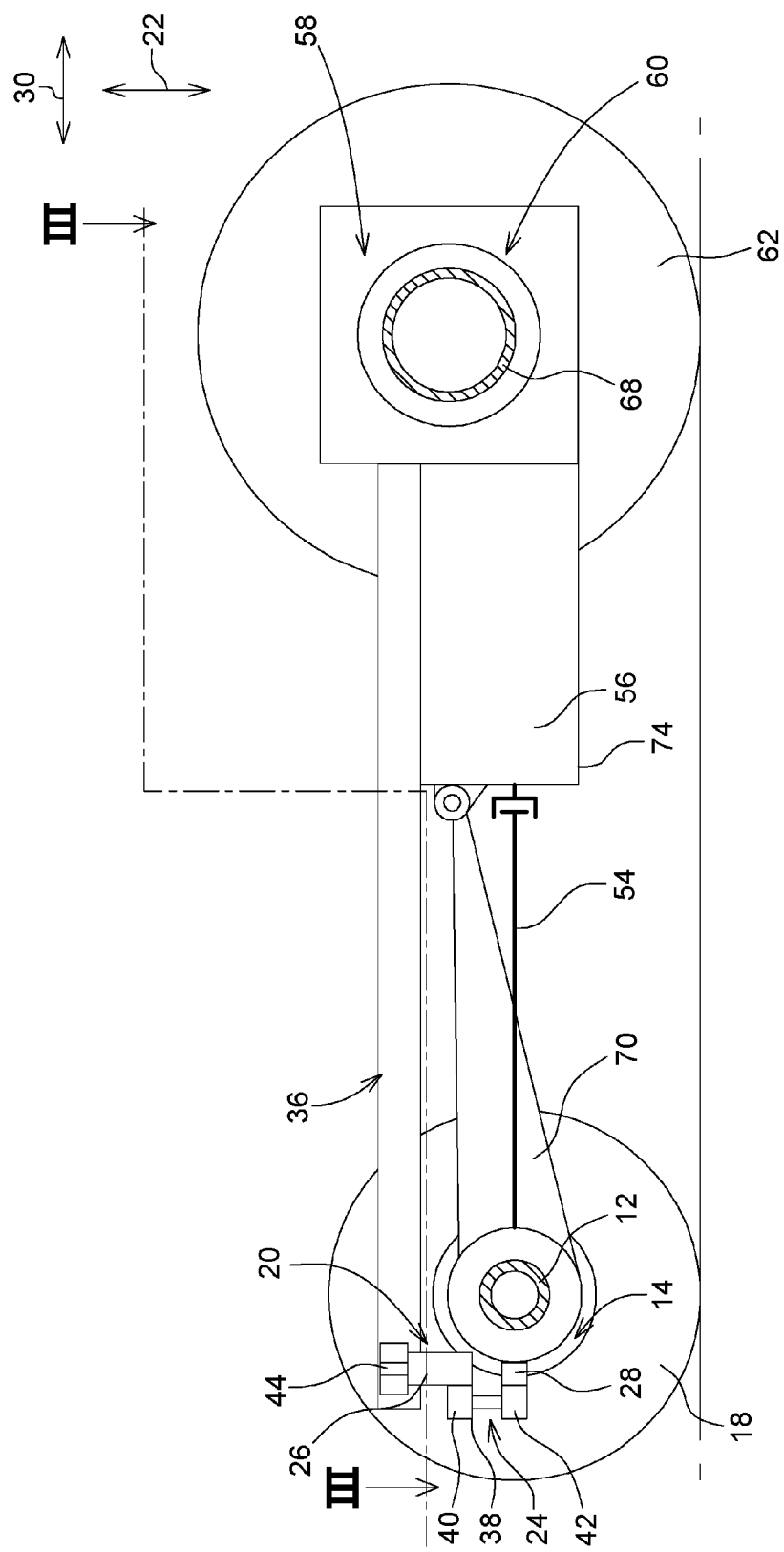
FIG. 2 is a schematic side view of the vehicle in accordance with viewing direction II in FIG. 1.
Figure 3:
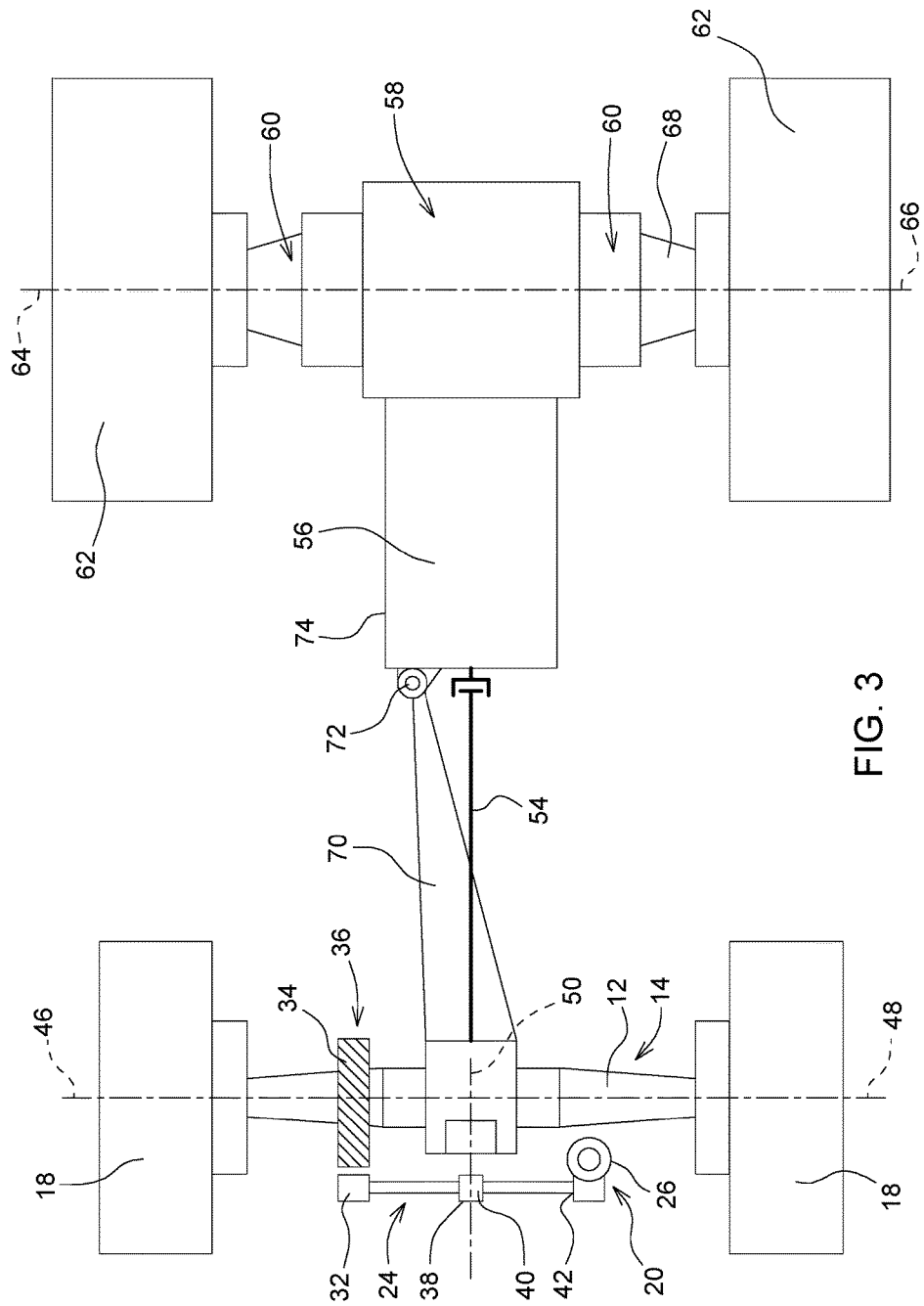
FIG. 3 is a schematic top view of the vehicle that is approximately along section line III-III in FIG. 2.

The transverse link 24 runs in the transverse direction 16. In specific embodiments, this includes the possibility that the transverse link 24 also extends in the height direction 22 or in a longitudinal direction 30 of the vehicle 10 that runs transverse to the height direction 22 and the transverse direction 16. In the embodiment depicted here, the transverse link 24 essentially extends in the transverse direction 16 (see FIGS. 1 and 3) and in the height direction 22 (see FIGS. 1 and 2).

The transverse link 24 is linked with a first link area 32 on a downward extension 34 of a support structure 36 of the vehicle 10, which is shown in a merely schematic manner. The transverse link 24 is linked with a second link area 38, via a pendulum support 40, on the axle body 12. Furthermore, the transverse link 24 has a third link area 42. With respect to the pendulum support 40, this third link area 42 is located, in the transverse direction 16, opposite the first link area 32, and is flexibly connected with the first coupling site 28 of the suspension device 20. A second coupling site 44 is present at a distance, in the upward direction 22, from the first coupling site 28. The suspension device 20 is linked to the support structure 36 with this.

The individual flexible connections on the first link area 32, the third link area 42, and the second coupling site 44 have an axle link or a spherical link. In the case of an axle link, its link axle runs parallel to the longitudinal direction 30. A pendulum axle of the pendulum support 40 is also situated parallel to the longitudinal direction 30.

In FIG. 1, the transverse link 24 is shown in its neutral, non-oscillated central position. In this position, a theoretical connecting line runs between the first link area 32 and the second link area 38 of the transverse link 24 in a manner approximately parallel to a middle longitudinal axis 46 of the axle body 12. Furthermore, the second link area 38 and the third link area 42 are staggered in the height direction 22 in such a way that the third link area 42 is located lower than the second link area 38. As can be seen in FIG. 1, such a relative arrangement of the first, second, and third link areas 32, 38, 42 can be attained by means of a strut-like and thus space-saving development of the transverse link 24. The height offset of the individual link areas 38, 42 can be simply attained by angled strut sections of the transverse link 24. The transverse link 24 is produced as one piece, wherein passage holes, boreholes, or the like can be considered on its link areas 32, 38, 42 so as to implement the flexible connections.

The third link area 42 of the transverse link 24, or at least a theoretical link axle of the third link area 42, running in a longitudinal direction 30, is located somewhat above a rotational axle 48 of the front wheels 18. The rotational axle 48 and the central longitudinal axle 46 coincide in the embodiment of the front axle 12 in accordance with FIG. 1. The pendulum axle 50 of the pendulum support 40, running in the longitudinal direction 30, is also located above the rotational axle 48 of the front wheels 18. Therefore, the pendulum axle 50 is located in an axle central plane 52 running transverse to the axial extension of the axle body 12.

The axle suspension merely requires a single hydraulic cylinder 26 for the desired spring-damper effect on both sides of the vehicle 10, i.e., along the transverse direction 16 on both sides of the central plane of the axle 52. This is attained by the development of the transverse link 24 with at least three link areas 32, 38, 42, of which the link area 42 is flexibly connected with the hydraulic cylinder 26. In this way, the hydraulic cylinder 26 can be located on one side in the transverse direction 16, with respect to the central plane of the axle 52. Via the lever construction of the transverse link 24 as a two-arm lever, the spring-damper effect can then be made available also on the other side of the vehicle 10 without the need to situate a hydraulic cylinder 26 (or another spring element) there. Consequently, this axle suspension can be produced at very low cost with a few components and can be located on the vehicle 10 with a great saving of space.

The hydraulic cylinder 26 usually acts as a passive component. Alternatively, the hydraulic cylinder 26 can also be designed so that it can be controlled by a user or automatically by a control unit, so as to change the spring-damper characteristics. In another embodiment, the hydraulic cylinder 26 can be operated in such a way that the distance between its coupling sites 28, 44 is adjusted inalterably in one mode of operation, and is again changeable in another mode of operation or several other modes of operation. If needed, the hydraulic cylinder 26 can act as a rigid connection part, i.e., with a constant distance between its coupling sites 28, 44, between the transverse link 26 and the support structure. The front axle 14 can then be operated as an unsprung and oscillating axle.

The front axle 14 is driven by a front wheel drive that is not depicted here. This front wheel drive is driven by a drive shaft 54 or a link shaft, which is operatively connected with a gear 56. The gear 56 is a component of a gear differential block 58, which is situated in the area of a rear axle 60 of the vehicle 10 and is rigidly connected, in a suitable manner with the support structure 36.

Supported on the rear axle 60, there are two rear wheels 62, whose rotational axle 64 coincides with a central longitudinal axis 66 of the axle body 68 of the rear axle 60.

Furthermore, for the suspension, a so-called thrust link 70 is provided. It is designed, more or less, in the form of a strut and is essentially oriented in the longitudinal direction 30. In the longitudinal direction 30, it supports the axle body 12 of the front axle 14 on the support structure 36. Forces acting on the front axle 14 in the longitudinal direction 30, for example, braking and acceleration forces, can be intercepted by means of the thrust link 70.

With its one longitudinal end, the thrust link 70 is rigidly connected with the axle body 12. With its longitudinal end that is located opposite in the longitudinal direction 30, the thrust link 70 is flexibly connected via a spherical link 72 to a housing 74 for the gear 56. Since the housing 74 is rigidly connected to the support structure 36, there is also an indirect spherical link connection between the support structure 36 and the longitudinal end of the thrust link 70 facing the support structure 36. In other embodiments, the thrust link 70 can be linked directly to the support structure 36 with a corresponding installation. The thrust link 70 is designed in such a manner that it at least partially surrounds the drive shaft 54, at a radial distance, along the longitudinal direction 30.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A vehicle, comprising:
a support structure;
a suspension for an oscillatingly supported, rigid axle body, wherein the suspension has a suspension device which is located between the axle body and the support structure and acts in a height direction of the vehicle, the axle body is a component of a front axle of the vehicle;
a plurality of coupling sites; and
a transverse link extending in a transverse direction of the vehicle, the transverse link being coupled to the support structure via a first link area and via a second link area and a pendulum support to the axle body, a pendulum axle of the pendulum support is located offset and above a rotational axle supported by the axle body in the height direction;
wherein, the transverse link comprises a third link area which, with reference to the pendulum support in the transverse direction of the vehicle, is located opposite the first link area and is flexibly connected with a coupling site of the suspension device.

2. The vehicle of claim 1, wherein the suspension device is flexibly connected with the support structure by a first coupling site at a distance from the third link area of the transverse link.

3. The vehicle of claim 1, wherein the flexible connection of at least one coupling site of the suspension device comprises an axle link.

4. The vehicle of claim 1, wherein the flexible connection of at least one coupling site of the suspension device comprises a spherical link.

5. The vehicle of claim 1, wherein a non-oscillated central position of the axle body, a connecting line between the first link area and the second link area of the transverse link extends approximately parallel to a central longitudinal axis of the axle body.

6. The vehicle claim 1, wherein the second link area and the third link area of the transverse link are staggered in the height direction, an axis defined by the second link area is located above an axis defined by the rotational axle in the height direction.

7. The vehicle of claim 6, wherein the first link area and the third link area are staggered in the height direction, an axis defined by the first link area is located above the axis defined by the rotational axle in the height direction.

8. The vehicle of claim 7, wherein an axis defined by the third link area is located above the axis defined by the rotational axle in the height direction.

9. The vehicle of claim 8, wherein the axis defined by the first link area and the axis defined by the second link area are aligned in the height direction.

10. The vehicle of claim 1, wherein an axis defined by the third link area is located above the axis defined by the rotational axle in the height direction.

11. The vehicle of claim 1, wherein a pendulum axle of the pendulum support is located in an axle central plane that runs transverse to an axial extension of the axle body.

12. The vehicle of claim 1, wherein the suspension device comprises a damper element that acts in the height direction.

13. The vehicle of claim 1, wherein the suspension device is operable in different modes of operation, a distance between the transverse link and the coupling site that are flexibly connected with the support structure is inalterably adjusted in one mode of operation and changeable in another mode of operation.

14. The vehicle of claim 1, wherein the front axle is a driven front axle.

15. The vehicle of claim 1, further comprising a thrust link that extends in a longitudinal direction of the vehicle that is connected with the axle body and with the support structure via a connector.

16. The vehicle of claim 15, wherein the connector is a spherical link that is offset in the transverse direction relative to a central vertical fore-and-aft plane defined by the vehicle.

17. The vehicle of claim 15, wherein the connector is a spherical link located offset and above the drive shaft in the height direction.

* * * * *